United States Patent [19]

Wakahara

[11] Patent Number: 5,145,045
[45] Date of Patent: Sep. 8, 1992

[54] CONTROL SYSTEM FOR LOCK-UP CLUTCH OF AUTOMATIC TRANSMISSION

[75] Inventor: Tatsuo Wakahara, Kanagawa, Japan

[73] Assignee: Nissan Motor Co., Ltd., Yokohama, Japan

[21] Appl. No.: 797,194

[22] Filed: Nov. 25, 1991

[30] Foreign Application Priority Data

Nov. 26, 1990 [JP] Japan .................... 2-321543

[51] Int. Cl.$^5$ ............................. F16D 33/00
[52] U.S. Cl. ..................... 192/3.29; 192/3.33
[58] Field of Search .................. 192/3.29, 3.33

[56] References Cited

U.S. PATENT DOCUMENTS

| | | | |
|---|---|---|---|
| 4,664,235 | 5/1987 | Yokoyama et al. | 192/3.29 |
| 4,989,702 | 2/1991 | Yoshimura et al. | 192/3.29 |
| 5,054,590 | 10/1991 | Paulsen | 192/3.29 X |
| 5,058,716 | 10/1991 | Lippe et al. | 192/3.33 |
| 5,090,527 | 2/1992 | Imamura et al. | 192/3.29 |

FOREIGN PATENT DOCUMENTS 63-172058 7/1988 Japan .

Primary Examiner—Dirk Wright
Attorney, Agent, or Firm—Foley & Lardner

[57] ABSTRACT

A control system for a lock-up clutch of an automatic transmission is provided which serves to change a variation rate of control pressure between partial engagement operation and full engagement operation, which adjusts a degree of lock-up clutch engagement. The system includes a lock-up control valve and a switching valve. The lock-up control valve is responsive to hydraulic pressure input to a first pilot port which is lower than a preselected threshold level to vary a pressure difference between apply and release chambers gradually at a first rate to establish disengagement or partial engagement of the lock-up clutch. The switching valve is responsive to hydraulic pressure input to a pilot port which is higher than a preselected threshold level to provide pilot pressure of a preselected level to a second pilot port of the lock-up control valve. The lock-up control valve is responsive to input of pressure into first and second pilot ports to vary the pressure difference between the apply and release chambers at a second rate greater than the first rate to establish full engagement of the lock-up clutch.

9 Claims, 1 Drawing Sheet

CONTROL SYSTEM FOR LOCK-UP CLUTCH OF AUTOMATIC TRANSMISSION

BACKGROUND OF THE INVENTION

1. Field of The Invention

The present invention relates generally to a hydraulic control system for an automatic type automotive transmission. More specifically, the invention relates to lock-up clutch control arrangements for an automotive vehicle.

2. Description of The Background Art

Japanese Patent First Publication No. 63-172058 discloses a lock-up clutch control system for an automatic transmission. This transmission includes a torque converter with a lock-up clutch. The torque converter includes an apply chamber and a release chamber defined therein. Pressure levels of hydraulic fluid supplied to the apply and release chambers are adjusted to control the operation of the lock-up clutch. For effecting this control, the system includes a lock-up control valve and a solenoid valve arranged in a hydraulic circuit. The solenoid valve serves to control the operation of the lock-up control valve. The lock-up control valve is operable to adjust a pressure difference between the apply and release chambers to establish disengagement, partial engagement, and full engagement of the lock-up clutch. The disengagement operation is accomplished by applying a hydraulic pressure to the release chamber and draining a hydraulic pressure from the apply chamber. The full engagement operation is accomplished by applying hydraulic pressure to the apply chamber while hydraulic pressure is being drained from the release chamber. Further, the partial engagement operation is achieved by adjusting a hydraulic pressure level in the release chamber to a preselected level allowing a certain clutch slippage.

However, the above prior art system has the drawbacks in that close control of the partial engagement of the lock-up clutch is difficult for the following reasons. The lock-up control valve includes a valve spool which has a land on which pilot pressure acts on an end surface thereof. The pilot pressure is adjusted by a solenoid valve to a desired level. The lock-up control valve then varies a level of hydraulic pressure supplied to the release chamber according to a degree of the pilot pressure input by a constant rate to establish partial engagement of the lock-up clutch. It will be noted that, the lower a variation ratio of hydraulic pressure in the release chamber to pilot pressure input to the lock-up control valve is, the more the pressure difference between the apply and release chambers is modified closely to control a degree of partial engagement of the lock-up clutch precisely. Therefore, in order to closely control a degree of partial engagement of the lock-up clutch, making an area of the end surface of the land which receives hydraulic pressure smaller is preferable to decrease the variation ratio of the release chamber pressure to the pilot pressure. However, if an area of the end surface of the land is made smaller, sometimes the valve spool of the lock-up control valve cannot be arranged at a position adequate to establish full engagement of the lock-up clutch. Accordingly, the area of the end surface of the land must be determined dependent upon the pilot maximum pressure required to establish full engagement of the lock-up clutch. It will be appreciated that modifying an area of an end surface of the valve spool on which pilot pressure acts to vary a variation ratio of the release chamber pressure to the pilot pressure is undesirable.

SUMMARY OF THE INVENTION

It is therefore a principal object of the present invention to avoid the disadvantages of the prior art.

It is another object of the invention to provide a control system for a lock-up clutch of an automatic transmission which is operable to control a degree of partial engagement of the lock-up clutch closely.

According to one aspect of the present invention, there is provided a lock-up clutch control system for an automotive transmission which includes a torque converter with a lock-up clutch and apply and release chambers for controlling a degree of engagement of the lock-up clutch according to a difference in hydraulic pressures between the apply and release chambers, the control system comprising a first valve, having first and second pilot ports, operable to control a degree of hydraulic pressure difference between the apply and release chambers according to pressure levels of hydraulic pressures input to the first and second pilot ports, the first valve being responsive to a hydraulic pressure input to the first pilot port which is less than a first preselected level to provide a first hydraulic pressure difference between the apply and release chambers for establishing disengagement of the lock-up clutch, the first valve being further responsive to a hydraulic pressure input to the first pilot port which is greater than the first preselected level and less than a second preselected level to vary the hydraulic pressure difference between the apply and release chambers at a first rate to provide a second hydraulic pressure difference between the apply and release chambers for establishing partial engagement of the lock-up clutch, and responsive to a hydraulic pressure input to the first pilot port which is greater than the second preselected level and a hydraulic pressure of a preselected pressure level input to the second pilot port to provide a third hydraulic pressure difference between the apply and release chambers for establishing full engagement of the lock-up clutch, and a second valve responsive to a hydraulic pressure input to a pilot port thereof which is greater than thed second preselected level to supply the hydraulic pressure to the second pilot port of the first valve for activating the first valve in cooperation with the hydraulic pressure input to the first pilot port for varying the hydraulic pressure difference between the apply and release chambers at a second rate greater than the first rate to establish the third hydraulic pressure difference.

According to another aspect of the present invention, there is provided a lock-up clutch control system for an automotive transmission which includes a torque converter with a lock-up clutch and apply and release chambers, for controlling a degree of engagement of the lock-up clutch according to a difference in hydraulic pressures between the apply and release chambers, the control system comprising valve means for adjusting a pressure level in the release chamber to control a difference in hydraulic pressures between the apply and release chambers to provide a first pressure difference between the apply and release chambers for establishing disengagement of the lock-up clutch, a second pressure difference which is greater than the first pressure difference for establishing partial engagement of the lock-up clutch, and a third pressure difference which is greater than the second pressure difference for establishing full engagement of the lock-up clutch, and control means providing a hydraulic signal to the valve means to vary the pressure level in the release chamber by a first rate when the second pressure difference and the first pressure difference are established and by a second rate which is greater than the first rate when the third pressure difference is established.

DESCRIPTION OF THE PREFERRED EMBODIMENT

Figure 1:
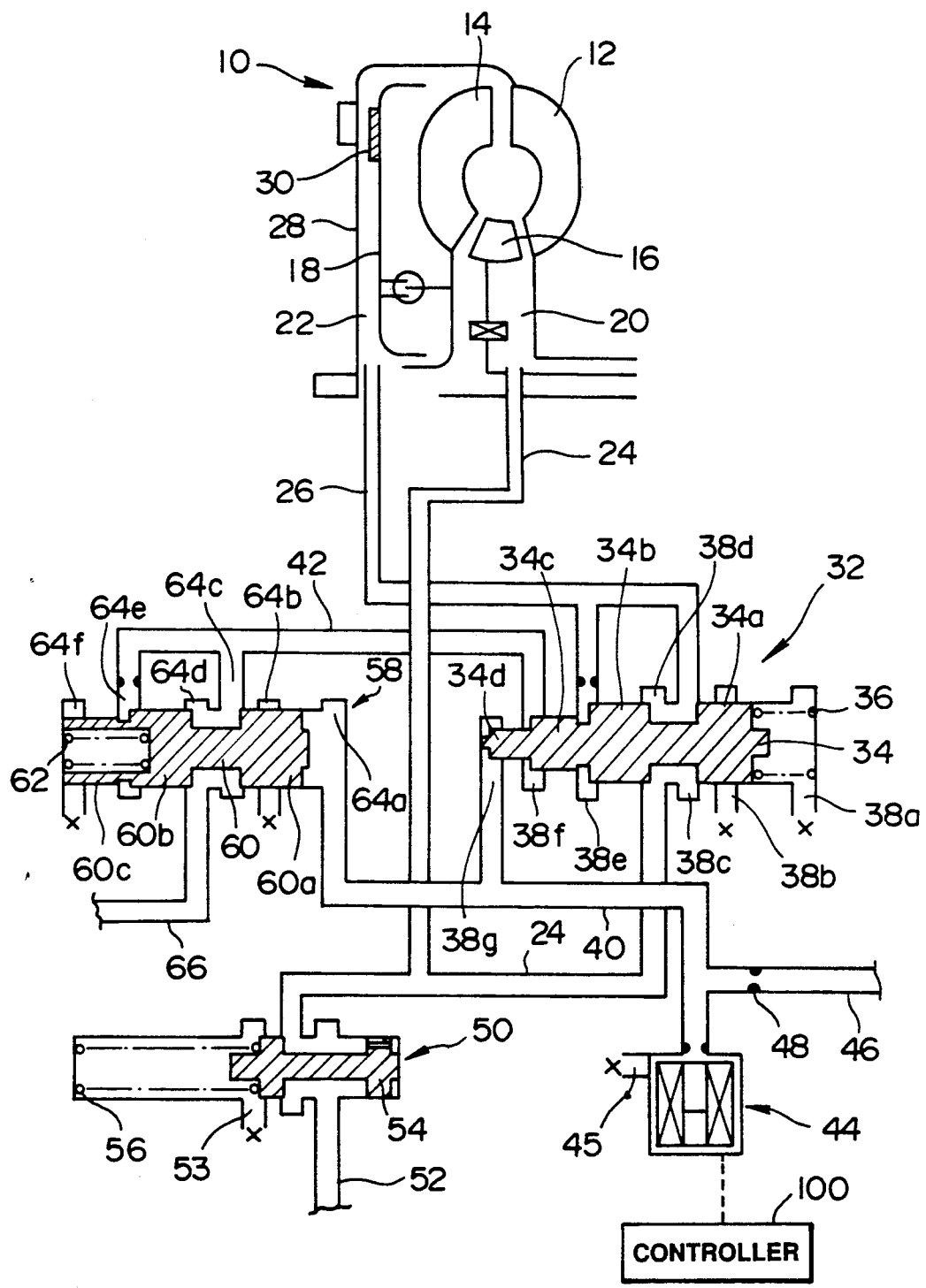
FIG. 1 is a block diagram which shows a control system for a lock-up clutch of an automatic transmission according to the present invention.

Referring now to FIG. 1, a control system for an automatic transmission of an automotive vehicle which incorporates a lock-up clutch is shown.

A torque converter 10 is operatively connected to a prime mover such as an internal combustion engine (not shown) and includes generally a pump impeller 12 as an input element, a turbine runner 14 as an output element, a stator 16, and a lock-up clutch piston 18. An apply chamber 20 is defined by the pump impeller 12, the turbine runner 14, and the stator 16. The apply chamber 20 and a release chamber 22 are defined on opposite sides of the lock-up clutch piston 18. The lock-up clutch piston 18 includes a facing 30 which contacts with a frictional surface of a cover 28 of the torque converter 10 according to a difference in hydraulic pressure between the apply and release chambers 20 and 22. A hydraulic line 24 is communicated with the apply chamber 20. In addition, a hydraulic line 26 is communicated with the release chamber 22.

The system includes a lock-up control valve 32 which serves to adjust supply of hydraulic pressure to the hydraulic line 26 for controlling a pressure level in the release chamber 22. The lock-up control valve 32 includes a spool 34 and a spring 36. The spool 34 is provided with lands 34a, 34b, 34c, and 34d. The lands 34a and 34b are of the same diameter, while the land 34c is smaller in diameter than the lands 34a and 34b. The land 34d is further smaller in diameter than the land 34c. It will be noted that an end surface of the land 34d, on which hydraulic pressure acts, is smaller than that of the land 34c and an end surface of the land 34c is smaller than that of the land 34b. The spool 34 is inserted in a valve bore formed in a housing of the control valve 32 and arranged slidably in a longitudinal or axial direction of the control valve. The housing includes ports 38a, 38b, 38c, 38d, 38e, 38f, and 38g. The ports 38a and 38b serve as drain ports. The ports 38c and 38e are communicated with the hydraulic line 26. The port 38d is communicated with the hydraulic line 24, the port 38f is communicated with a hydraulic line 42, and the port 38g is communicated with a hydraulic line 40. Ports 38f and 38g function as pilot ports respectively for displacing the spool 34 dependent upon pilot pressures input thereto.

The system further includes a solenoid valve 44 which serves to control a level of hydraulic pressure in the hydraulic line 40. The hydraulic line 40 is connected to a hydraulic line 46 in which an orifice 48 is arranged and to which a constant pressure of hydraulic fluid is supplied from a pressure source (not shown). The solenoid valve 44 is driven by a controller 10 which incorporates a solenoid valve driver. The controller outputs a signal such as a pulse signal having a preselected duty ratio (duty factor) to the solenoid valve 44 to open or close the drain port 45 for controlling discharge of hydraulic fluid from the drain port 45 which is supplied from the hydraulic line 46 to the hydraulic line 40 for controlling a pressure level in the line 40. It will be noted that a degree of a duty ratio of a signal from the controller 100 to the solenoid valve 44 determines a pressure level in the hydraulic line 40.

The system further includes a torque converter relief valve 50 which is operable to supply torque converter supply pressure of a constant level to the hydraulic line 24. The relief valve 50 includes a spool 54 and a spring 56 which urges the spool to the right, as viewed in the drawing, under a preselected pressure. When hydraulic pressure greater than a preselected level is supplied to the relief valve 50 from a hydraulic line 52, the spool is displaced in a left direction against spring force of the spring 56 to establish fluid communication between the line 52 and a drain port 53 to discharge excess pressure for maintaining the hydraulic fluid supplied to the hydraulic line 24 at a preselected level.

A directional control valve or switching valve 58 is provided which serves to control hydraulic pressure in the hydraulic line 42 leading to the port 38f of the lock-up control valve 32. The switching valve 58 includes a spool 60 and a spring 62. The spool 60 includes lands 60a, 60b, and 60c. The lands 60a and 60b are the same in diameter. The land 60c is smaller in diameter than the lands 60a and 60b. The spool 60 is inserted into a valve bore formed in a valve housing slidably in an axial direction. Ports 64a, 64b, 64c, 64d, 64e, and 64f are formed in the valve housing. The port 64a is communicated with the hydraulic line 40. The ports 64b and 64f serve as drain ports respectively. The ports 64c and 64e are communicated with the hydraulic line 42. The port 64d functions as a pilot port and is communicated with a hydraulic line 66 to which a line pressure of a constant level is supplied as a pilot pressure from the pressure source.

In operation, disengagement of the lock-up clutch piston 18 with the frictional surface of the cover 28 is accomplished in the following manner. The controller 100 provides a signal having a duty ratio of approximately zero to the solenoid valve 44. The solenoid valve is then arranged at a fully opened position to discharge the hydraulic fluid, supplied from the line 46 to the line 40, from the drain port 45, reducing a pressure level in the hydraulic line 40, below a first threshold level, or to about zero. Thus, a pressure level in the port 64a of the switching valve 58 becomes zero, causing the spool 60 to be displaced completely to the right, as viewed in the drawing, by the spring force of the spring 62 so that the land 60b blocks the port 64d, establishing fluid communication between the drain port 64b and the port 64c. Therefore, a pressure level in the hydraulic line 42 becomes zero, resulting in a pressure of zero in the port 38f of the lock-up control valve 32. Additionally, due to the zero pressure level in the hydraulic line 40, pressure in the port 38g also becomes zero. With the lowered pressure in the port 38g, the spool 34 of the lock-up control valve 32 is urged left by the spring force of the spring 36 as shown in FIG. 1 to establish fluid communication between the ports 38c and 38d for allowing the hydraulic pressure in the line 24 to be supplied to the release chamber 22 through the line 26. This causes the same pressure level as in the apply chamber 20 to act in the release chamber 22 for establishing disengagement of the lock-up clutch piston 18 with the frictional surface of the cover 28. It will be appreciated that the torque converter transmits engine torque through liquid only.

Partial engagement of the lock-up clutch piston 18 allowing a certain slippage is accomplished from the above disengaged state in the following manner. The controller 100 increases a duty ratio of an output signal gradually towards a desired value and provides it to the solenoid valve 44. The solenoid valve 44 is then responsive to an increase in the duty ratio to be arranged at a partially closed position for supplying a portion of the hydraulic pressure from the hydraulic line 46 to the hydraulic line 40, elevating the hydraulic pressures in the ports 64a of the switching valve 58 and the port 38g of the lock-up control valve 32 to a preselected level. This pressure level is provided within the range from the above first threshold level to a second threshold level as described hereinafter.

The pressure level within the above range does not overcome a spring force of the spring 62 of the switching valve 58, therefore, the spool 60 is not displaced and maintains to block fluid communication between the ports 64c and 64d. Thus, a pressure level in the line 42 is not elevated in this situation. On the other hand, the lock-up control valve 32 is responsive to the increase in the hydraulic pressure in the port 38g to urge the spool 34 against the spring force of the spring 36. In other words, the elevated pressure in the port 38g acts on an end surface (i.e., pressure receiving surface) of the land 34d to thrust the spool 34 gradually to the right according to increase in the duty ratio of the signal input to the solenoid valve 44, balancing the spring force of the spring 36 and forces created by pressures acting on the end surfaces of the lands 34d and a portion of a left end surface of the land 34b from which an area corresponding to a right end surface of the land 34c is subtracted. Thus, the drain port 38b being partially opened to establish partial fluid communication between the port 38c and the drain port 38b, discharging a portion of the hydraulic pressure in the release chamber 22 through the hydraulic line 26, resulting in a pressure level in the release chamber 22 being decreased to a preselected level to cause a pressure difference between the release chamber 22 and the apply chamber 12 to be generated. The facing 30 of the lock-up clutch piston 18 is then pressed against the frictional surface of the cover 28 by a degree determined by the pressure difference between the release chamber 22 and the apply chamber 12. It will be noted that the magnitude of the partial engagement of the lock-up piston 18, or clutch slippage is determined by a duty ratio of a signal for the solenoid valve 44.

Therefore, when a duty ratio of a signal output from the controller 100 to the solenoid valve 44 is lower than a preselected value and a pressure level in the hydraulic line 40 is provided within the range from the first threshold level to the second threshold level, the switching valve 58 is not activated, while the lock-up control valve 32 is activated, to decrease a pressure level in the release chamber 22 for establishing partial engagement of the lock-up clutch piston 18.

When the duty ratio of the signal input to the solenoid valve 44 is increased towards about 100 percent (%), the solenoid valve 44 is arranged at a completely closed position. The hydraulic pressure from the line 46 is then transmitted to the line 40 directly, raising a pressure level in the hydraulic line 40 towards a preselected level which is higher than the second threshold level. This elevated pressure then acts on an end surface of the land 60a of the spool 60 of the switching valve 58 to push the spool to the left against the spring force of the spring 62, establishing fluid communication between the ports 64c and 64d. The line pressure in the line 66 is transmitted to the line 42 and then acts on an end surface of the land 34c of the spool 34 of the clutch control valve 32. Additionally, the elevated pressure in the line 40 acts on the end surface of the land 34d of the clutch control valve 32. Therefore, a resultant force of the hydraulic pressures, acting on the end surfaces of the lands 34c and 34d, thrusts the spool 34 against the spring force of the spring 36. In other words, the spool 34 is shifted until a resultant force of hydraulic pressures acting on the end surfaces of the lands 34c and 34d and, hydraulic pressure acting on a portion of an end surface of the land 34b from which an area corresponding to a right end surface of the land is subtracted, is balanced with the spring force of the spring 36. The drain port 38b is therefore fully opened. The hydraulic pressure in the line 26 is completely discharged from the drain port 38b to reduce the pressure in the release chamber 22 to about zero quickly for increasing the pressure difference between the apply chamber 20 and the release chamber 22 greater than that in the partial engagement operation to fully engage the lock-up clutch piston 18 with the frictional surface of the cover 28. The lock-up clutch piston 18 is fully engaged to connect the pump impeller 12 and the turbine runner 14 directly.

As mentioned previously, while hydraulic pressure in the line 40 is elevated within the range from the first threshold level to the second threshold level due to increase in the duty ratio of the signal output from the controller 100, the elevated pressure acts on the end surface of the land 34d of the lock-up control valve 32 to shift only the spool 34. Thus, the pressure difference in the apply chamber 20 and the release chamber 22 is increased slower (by a first rate or gain) than a rate of pressure elevation in the line 44. On the other hand, when the hydraulic pressure in the line 40 rises above the second threshold level, both hydraulic pressures in the lines 40 and 42 act on the spool 34 of the lock-up control valve 32, therefore, the spool is shifted more quickly than the rate of pressure elevation in the line 44, increasing the pressure difference between the apply and release chambers 20 and 22 speedily by a second rate, or gain which is greater than the first gain.

It will be appreciated that partial engagement of the lock-up clutch piston 18 is controlled by a variation in the pressure difference between the apply and release chambers by a smaller gain (the first gain) as compared with the full engagement clutch operation. Accordingly, the limits of partial engagement control are wide and the magnitude of partial engagement is adjusted precisely.

What is claimed is:

1. A lock-up clutch control system for an automotive transmission which includes a torque converter with a lock-up clutch and apply and release chambers for controlling a degree of engagement of the lock-up clutch according to a difference in hydraulic pressures between the apply and release chambers, comprising:

a first valve, having first and second pilot ports, operable to control a degree of hydraulic pressure difference between the apply and release chambers according to pressure levels of hydraulic pressures input to the first and second pilot ports, said first valve being responsive to a hydraulic pressure input to the first pilot port which is less than a first preselected level to provide a first hydraulic pressure difference between the apply and release chambers for establishing disengagement of the lock-up clutch, said first valve being further responsive to a hydraulic pressure input to the first pilot port which is greater than the first preselected level and less than a second preselected level to vary the hydraulic pressure difference between the apply and release chambers at a first rate to provide a second hydraulic pressure difference between the apply and release chambers for establishing partial engagement of the lock-up clutch, and responsive to a hydraulic pressure input to the first pilot port which is greater than the second preselected level and a hydraulic pressure of a preselected pressure level input to the second pilot port to provide a third hydraulic pressure difference between the apply and release chambers for establishing full engagement of the lock-up clutch; and a second valve responsive to a hydraulic pressure input to a pilot port thereof which is greater than said second preselected level to supply the hydraulic pressure to the second pilot port of said first valve for activating the first valve in cooperation with the hydraulic pressure input to the first pilot port for varying the hydraulic pressure difference between the apply and release chambers at a second rate greater than the first rate to establish the third hydraulic pressure difference.

2. A control system as set forth in claim 1, further comprising a solenoid valve and a controller, said controller providing a signal having a preselected duty ratio to said solenoid valve, said solenoid valve being responsive to the signal from said controller to adjust the hydraulic pressures supplied to the first and second pilot ports of said first valve and the pilot port of said second valve according to a degree of the duty ratio.

3. A control system as set forth in claim 1, wherein said first valve is fluidly communicated with the apply and release chambers through first and second hydraulic lines, said first valve being responsive to hydraulic pressure less than the first preselected level input to the first pilot port to establish fluid communication between the first and second hydraulic lines to provide the first pressure difference between the apply and release chambers, said first valve further responsive to hydraulic pressure within the range from the first preselected level to the second preselected level to establish partial communication between the second line and a drain port for discharging a portion of the hydraulic pressure in the release chamber from the drain port to provide the second pressure difference, and responsive to hydraulic pressure greater than the second preselected level to establish full communication between the second line and the drain port for discharging the hydraulic pressure in the release chamber from the drain port to provide the third pressure difference.

4. A control system as set forth in claim 1, wherein the first pilot port of said first valve and the pilot port of said second valve are communicated with a pressure source through a common hydraulic line, said first valve being responsive to hydraulic pressure supplied through the common hydraulic line which is greater than the first preselected level to be activated, said second valve being responsive to hydraulic pressure supplied through the common hydraulic line which is greater than the second preselected level to be activated.

5. A control system as set forth in claim 3, further comprising a relief valve which is communicated with the first hydraulic line for supplying a torque converter supply pressure of a constant level.

6. A control system as set forth in claim 3, wherein said first valve includes a spool and a spring, the spool being responsive to the hydraulic pressure input to the first and second pilot ports to be displaced against a spring force of the spring to block or communicate between the first line and the second line and between the first line and the drain port.

7. A control system as set forth in claim 6, wherein said spool includes first and second lands, the first land having an end surface on which hydraulic pressure in the first pilot port acts, the second land having an end surface on which hydraulic pressure in the second pilot port acts, an area of the end surface of the first land being smaller than that of the second land.

8. A control system as set forth in claim 3, wherein said second valve includes a spool and spring, the spool being responsive to hydraulic pressure greater than the second preselected level input to the pilot port to be displaced against a spring force of the spring to supply hydraulic pressure of a constant pressure to the second pilot port of said first valve.

9. A lock-up clutch control system for an automotive transmission which includes a torque converter with a lock-up clutch and apply and release chambers, for controlling a degree of engagement of the lock-up clutch according to a difference in hydraulic pressures between the apply and release chambers, comprising:

valve means for adjusting a pressure level in the release chamber to control a difference in hydraulic pressures between the apply and release chambers to provide a first pressure difference between the apply and release chambers for establishing disengagement of the lock-up clutch, a second pressure difference which is greater than the first pressure difference for establishing partial engagement of the lock-up clutch, and a third pressure difference which is greater than the second pressure difference for establishing full engagement of the lock-up clutch; and control means providing a hydraulic signal to said valve means to vary the pressure level in said release chamber by a first rate when the second pressure difference and the first pressure difference are established and by a second rate which is greater than the first rate when the third pressure difference is established.

* * * * *